United States Patent Office 2,911,311
Patented Nov. 3, 1959

2,911,311

CALCIUM ALUMINATE BINDER

Roy C. Feagin, Mountain Lakes, and Robert B. Sosman, Westfield, N.J., and Robert A. Horton, New York, N.Y., assignors, by mesne assignments, to Howe Sound Company, New York, N.Y., a corporation of Delaware No Drawing. Application August 8, 1955
Serial No. 527,162

19 Claims. (Cl. 106—38.9)

The present invention relates to novel refractory investment compositions and to processes of employing said compositions in preparing molds for metal castings.

The procedure for forming a mold for a metal casting generally involves combining the investment composition with a liquid acting as a binder, such as an organic silicate, to form a plastic moldable mass and, thereafter, shaping this mass to a predetermined form about a model.

The model is then removed from the mold. Where the model is thermoplastic or combustible, this is effected by burning. Alternatively, a multi-unit mold may be formed and then separated to remove the model without destruction of the latter.

This shaped preliminary mold is then fired at high temperatures to form the final mold which may be used for metal casting.

In casting metals it is necessary to employ molds which are sufficiently refractory to withstand the high temperatures encountered. Furthermore, the preliminary mold must have sufficient green strength to withstand moderate handling and moving about without crumbling or losing its shape.

The setting of the components of the preliminary mold will often cause a shrinkage so that the preliminary mold, after drying before firing, will be somewhat smaller than the model. Firing itself will produce a shrinkage due to sintering or fusion of the particles which are more or less porous. Simultaneously, the high temperatures cause a slight thermal expansion together with a reaction which may also tend to expand the mold. It is desirable that the expansion of the mold during firing at least counterbalances its shrinkage and, preferably, produces a sufficient over-all increase in the dimension of the mold to compensate for the shrinkage which metal cast at high temperatures undergoes upon cooling.

Finally, the mold should be sufficiently porous to permit the escape of gases which may be formed during the casting and which will leave holes or imperfections in the casting if not vented.

It is a principal object of the present invention to provide novel investment compositions which show all the desirable properties outlined above and which simply by addition of water can be converted into a moldable mass without the use of any other binder liquid.

A further object of the invention is to provide novel compositions for forming preliminary molds with sufficient green strength to withstand normal handling without damage thereto.

Another object of the invention is to provide novel compositions which upon firing will produce strong, refractory, and porous molds.

Still another object is to provide novel compositions which when fired will undergo a controlled reaction expansion at least sufficient to compensate for shrinkages.

Another object is to provide novel compositions which when fired will expand to a controlled extent to compensate for the expansion at casting temperatures of the metal cast.

A further object is to provide a novel binder which when combined with refractory fillers produces molds having the aforementioned characteristics.

Another object of the invention is to provide some compositions which set rapidly.

It has been found that certain calcium aluminates when used as binders in suitable proportions with refractory fillers will produce investment compositions which exhibit the desired properties.

Specifically, calcium aluminates having a calcium content expressed as CaO of about 15–49% by weight give excellent results when combined with certain refractory materials. Suitable refractory materials include compositions of zircon and periclase (either natural or synthetic), silica and periclase, and kyanite. In these compositions the calcium aluminate may comprise about 3% to about 35% by weight of the entire mass. The compositions containing higher proportions of calcium aluminates set more rapidly and form molds which are harder and less refractory. Increasing the aluminate content beyond 35% produces molds which are not sufficiently refractory and which are so hard that they may cause damage to the castings. Moreover, the molds are very strong and non-porous so that if gas accumulates, it cannot escape and faults result in the casting rather than in the mold.

Lower proportions of calcium aluminate, on the other hand, increase the setting time, and the preliminary mold, before firing, may lack sufficient green strength for normal, indelicate handling. Consequently, for dental castings where small masses must be cast rapidly, the calcium aluminate content should be in excess of about 15% and up to 35%, while for industrial castings more refractory compositions containing only about 3% to 15% calcium aluminate may be employed.

Variations in the calcium oxide content of the calcium aluminate produce similar changes and thus the calcium oxide content for industrial castings may range from about 15% to 35% of the calcium aluminate. For dental castings it should preferably be above 35% and up to 49%.

Where periclase and zircon (zirconium silicate) supplement the calcium aluminate in making up the investment composition, the periclase may range from about 3% to about 75% by weight of the entire solids while the zircon may range from about 5% to 75%. During firing these materials react with each other and with the calcium aluminate in some complex manner to compensate for the dry shrinkage as well as for the shrinkage of the molten metal upon solidification. The extent of reaction is dependent in part upon the particle size of the components and at least a portion of the zircon should be finely ground, i.e., less than 0.044 mm. in diameter. Coarse zircon remains largely unreacted and thus serves as an inert refractory filler. Consequently, it may be replaced in part by other inert refractory fillers such as calcined alumina, zirconia, thoria, beryllia, and the like, these fillers being coarsely ground and serving to balance the over-all particle size distribution to overcome the drying shrinkage of the shaped mass before firing.

For dental purposes a preferred range of finely ground periclase is 3% to 15% by weight and the zircon is employed in an amount ranging from 15% to 45%, a least 10% being finely ground. The balance is made up of calcium aluminate and a filler, as indicated. As much as 71% by weight of calcined alumina may be employed with satisfactory results.

Where periclase and silica are employed, periclase may range from 7% to 92% by weight, while silica may range from 5% to 20%. The preferred range for silica is 7.5% to 20%, higher porportions reducing the refractoriness. The periclase is preferably employed in an amount ranging from 60% to 77% although if about 7% is finely ground, the remainder which functions as an inert filler may be replaced by other inert, coarsely ground, refractory fillers.

Where kyanite is employed, at least 3% is present as finely ground material and up to 75% may be employed. The kyanite may be supplemented or partly replaced by a coarse inert filler which preferably is non-expanding since kyanite-calcium aluminate compositions will expand considerably upon firing.

The investment compositions may include minor amounts of mineralizers or expansion modifiers which either reduce the temperature required to obtain a given expansion or which accelerate or retard setting, as desired. For this purpose, about 1–2% of alkalizers such as soda lime glass, or halides such as topaz, calcium chloride, magnesium chloride, ammonium chloride and hydrogen chloride have proven useful. The inorganic chlorides are especially suitable for increasing expansion. These materials, where soluble, may be added dissolved in the water or, alternatively, may be incorporated with the solids.

The particular advantages attending the use of calcium aluminate as the binder are its ability to set with water which is, of course, cheaper than any other binder liquid. The aluminate is also inexpensive and will not take up water upon standing in the open atmosphere. Consequently, its shelf life is long and it will not harden accidentally during storage or non-use. Finally, it forms a good bond prior to firing, and upon firing it will react with the indicated refractories to give a controlled, reproducible expansion.

The solids of the investment composition are mixed with the water which may contain a mineralizer, as indicated. About 10 to 30 cc. of water are employed per 100 grams of solids, the exact amount depending upon how much is required to produce a pasty mass which will "flow" when vibrated. The mass may be rendered homogenous either prior to or during addition of the water.

The paste-like mass is then formed to the desired shape for instance, by investing a model, and permitted to harden, and the resulting preliminary mold is fired at elevated temperatures in the range of about 2000° F. to form the refractory mold. Where a combustible or low melting model has been employed, it will automatically be lost during firing. Where an indestructible model has been employed, the mold is removed therefrom, and metal is thereafter cast in the mold in the conventional manner.

With calcium aluminate having a calcium oxide content ranging from about 15% to 49%, it is necessary that the indicated refractories be employed to obtain the desired expansion. In a preferred embodiment of the invention, however, it has been found that considerable expansion and rapid setting may be generally obtained with all refractories when the calcium aluminate binder consists essentially of at least one compound having from about 47–49% by weight of calcium oxide. This range represents either a $12CaO.7Al_2O_3$ or a $5CaO.3Al_2O_3$ and it is presently uncertain in the art which of these formulations is actually involved. It should be noted that the binder consists of but one or two calcium aluminate compounds having the indicated calcium oxide content and does not consist of a mixture of many compounds including plain calcium oxide and plain alumina having an over-all calcium oxide content as indicated.

Because of its fast set, this binder is especially useful for dental castings where it is preferably used in an amount ranging from about 15% to 25% by weight with periclase, zircon, and inert fillers as the refractory mass.

In the following examples, which illustrate procedures employing the novel compositions in the formation of molds for metal casting, the following typical particle size distributions prevail for the indicated substances, although considerable variation in particle size is possible:

Milled zircon (G):
   Approximately 99% —325 mesh
   Average less than 44 microns Granular zircon (G):

| Mesh— | Percent on |
|---|---|
| 20 | 0 |
| 40 | 0 |
| 60 | 0 |
| 80 | 2.6 |
| 100 | 11.2 |
| 140 | 65.5 |
| 200 | 19.8 |
| Thru 200 | 0.6 |

Graded tumbled periclase:

| Mesh— | Percent on |
|---|---|
| 20 | 0 |
| 30 | 0 |
| 40 | 7.6 |
| 60 | 6.9 |
| 80 | 4.3 |
| 100 | 3.3 |
| 140 | 10.3 |
| 200 | 13.4 |
| Thru 200 | 54.5 |

*Example I*

(*a*) To illustrate the rapid set, a batch of calcium aluminate consisting of a single compound having the approximate empirical formula $5CaO.3Al_2O_3$ was mixed with distilled water to form a viscous pasty mass. It sets hard in 6 minutes.

(*b*) To 100 grams of an investment composition having the following constitution by weight:

20% $5CaO.3Al_2O_3$
   58% granular zircon
   15% milled zircon
   5% periclase passing through 200 mesh
   1% ground glass
   1% $NH_4Cl$ 26 ml. of distilled water were added and the mass set hard in 26 minutes. The investment upon firing at 2100° F. expanded to 5.53% over its original length at room temperature.

*Example II*

To 16 ml. of a 1.0 N solution of $NH_4Cl$ there were added 100 grams of an investment composition comprising, by weight:

20% mono-calcium aluminate
   10% milled zircon
   30% coarse tumbled periclase
   40% periclase passing through 200 mesh The mass hardens in 20 minutes, and after being fired to 2000° F. for 30 minutes expands to a constant value of 101.84%.

*Example III*

An investment composition comprising:

20% calcium aluminate cement of empirical composition $CaO.3Al_2O_3$ but containing some free $Al_2O_3$
10% milled zircon
30% coarse tumbled periclase
40% periclase passing through 200 mesh was mixed with distilled water using 16 ml. per 100 grams. The mass following hardening was fired to 1900° F. and showed over 2.6% expansion.

Example IV 23 ml. of distilled water were mixed with each 100 grams of an investment composition comprising, by weight:

- 10% mono calcium aluminate
- 10% milled zircon
- 79% graded tumbled periclase
- 1% ground glass and after shaping and hardening the mass was fired to 2000° F. for 3 hours with 2.02% expansion. A "Vitallium" denture was cast successfully in the mold so prepared.

Example V

An investment composition comprising, by weight:

- 20% mono calcium aluminate
- 10% periclase passing through 200 mesh
- 20% periclase passing through 60 mesh and retained by 100 mesh
- 30% periclase retained by 60 mesh
- 5% flint —200 mesh (silica)
- 15% Ottawa sand (silica) 100 mesh was mixed with 1.0 N ammonium chloride solution in the proportion of 16 ml. per 100 grams of investment. The hardened investment expanded to 2.93% when fired to 2000 F. for 2¾ hours.

Example VI 20 ml. of $MgCl_2$ solutions as indicated below were used as the binder liquid for each 100 grams of the following investment composition, which was subsequently fired to 2000° F.:

- 20% mono calcium aluminate
- 20% periclase passing through 200 mesh
- 20% flint —200 mesh (silica)
- 40% Ottawa sand (silica) 100 mesh (a) When the $MgCl_2$ solution was 1.0 N the expansion was 1.7%.

(b) When the $MgCl_2$ solution was 1.5 N the expansion was 4%.

Example VII

Each 100 grams of an investment composition comprising, by weight:

- 20% $5CaO.3Al_2O_3$
- 10% periclase passing through 200 mesh
- 7% milled zircon
- 31% calcined alumina passing through 100 mesh and retained by 80 mesh
- 31% calcined alumina passing through 220 mesh and retained by 240 mesh
- 1% ground glass was mixed with 20 ml. of liquid as set forth hereafter, set and hardened rapidly, and then fired under the indicated conditions:

(a) With distilled water as liquid, firing at 2150° F. produced 0.65% expansion.

(b) With distilled water as liquid, firing at 2250° F. produced 0.82% expansion.

(c) With distilled water as liquid and 1% $NH_4Cl$ as an additive, firing at 2150° F. produced more than 2% expansion.

Example VIII

Each 100 grams of the following investment composition were mixed with 16 ml. of 1.0 N HCl and upon firing to 2100° F. for 1¾ hours expanded 2.04%:

- 20% mono calcium aluminate
- 69% raw kyanite 35 mesh
- 10% raw topaz passing through 325 mesh
- 1% ground glass To establish that calcium aluminate when used as a binder enters into chemical combination with the refractory material the following comparisons were made:

Example IX (a) Investments of periclase and zircon were prepared with hydrolyzed tetra-ethyl silicate as binder. The percentage of zircon was varied from 0 to 30% and a maximum expansion of 2.21% was obtained with 22.5% zircon.

(b) When the zircon comprised 22.5% of the zircon-periclase mixture and 10% mono calcium aluminate was added as binder with water (in place of the silicate) an expansion of 5.55% was obtained.

Example X

An investment composition comprising 20% by weight of a calcium aluminate having the empirical formula $5CaO.3Al_2O_3$ or $12CaO.7Al_2O_3$ and 80% by weight of 220 mesh calcined alumina was mixed with water in such proportion that for each 100 grams of investment composition 26 ml. of water were employed. The initial set took place in 7 minutes and after 13 minutes' total elapsed time the set was hard. After being air dried overnight and fired to a temperature of 2200° F. the composition expanded about 0.4%.

Example XI

Each 100 grams of an investment composition comprising by weight:

- 20% $5CaO.3Al_2O_3$
- 10% raw kyanite —200 mesh
- 70% raw kyanite —35 mesh were mixed with 21.5 ml. of water and the mass had an initial set time of 7 minutes. After a total time of 19 minutes the mass had set hard and upon firing to 2000° F. it exhibited an expansion of about 0.34%.

Example XII

Each 100 grams of the following investment composition were mixed with 26 ml. of water:

- 20% $5CaO.3Al_2O_3$
- 10% flint —200 mesh
- 10% periclase —200 mesh
- 60% graded tumbled periclase The initial set time was 11 minutes and in a little over 2 hours the mass had set hard. Upon firing to 2200° F. the mass expanded 0.84%.

Various changes and modifications may be made without departing from the spirit and scope of the present invention and it is intended that such obvious changes and modifications be embraced by the annexed claims.

What is claimed is:

1. An investment composition consisting essentially of about 3 to 35% by weight of calcium aluminate as a binder, said calcium aluminate comprising about 15 to 49% by weight of calcium oxide, and a refractory material selected from the group consisting of (a) periclase and zircon, (b) periclase and silica, and (c) kyanite wherein (a) is 3 to 75% periclase and 5 to 75% zircon, by weight of the composition, and (b) is 7 to 92% periclase and 5 to 20% silica, by weight of the composition.

2. An investment composition consisting essentially of about 3 to 35% by weight of calcium aluminate as a binder, said calcium aluminate comprising about 15 to 49% by weight of calcium oxide, and a refractory material consisting essentially of about 3 to 75% by weight of periclase based on the entire weight of said composition, and about 5 to 75% by weight of zircon based on the entire weight of said composition.

3. An investment composition according to claim 2, said refractory material including up to 71% by weight of calcined alumina based on the entire weight of said composition.

4. A dental investment composition consisting essentially of about 15 to 35% by weight of calcium aluminate as a binder, said calcium aluminate comprising about 15 to 49% by weight of calcium oxide, and a refractory material consisting essentially of about 3 to 75% by weight of periclase based on the entire weight of said composition, and about 5 to 75% by weight of zircon based on the entire weight of said composition.

5. An investment composition comprising about 3 to 35% by weight of calcium aluminate as a binder, said calcium aluminate comprising about 15 to 49% by weight of calcium oxide, and a refractory material comprising about 7.5 to 20% by weight of silica based on the entire weight of said composition, and at least 7% by weight of finely ground periclase based on the entire weight of said composition, the balance being made up of substantially inert refractory filler.

6. An investment composition comprising about 20% by weight of calcium aluminate as a binder, said calcium aluminate comprising about 15 to 49% by weight of calcium oxide, and a refractory material comprising about 7.5 to 20% by weight of silica based on the entire weight of said composition, and at least 7% by weight of finely ground periclase based on the entire weight of said composition, the balance being made up of substantially inert refractory filler.

7. An investment composition comprising about 15 to about 35% by weight of calcium aluminate as a binder, said calcium aluminate comprising about 15 to 49% by weight of calcium oxide, and about 3 to 75% by weight of kyanite, the balance being made up of substantially inert refractory filler.

8. An investment composition comprising about 3 to 35% by weight of a binder consisting essentially of at least one calcium aluminate compound having from about 47 to 49% by weight of calcium oxide, about 5 to 75% by weight of zircon, and at least 7% of finely ground periclase, the balance being made up of substantially inert refractory filler.

9. An investment composition consisting essentially of about 3 to 35% by weight of a binder consisting essentially of at least one calcium aluminate compound having from about 47 to 49% by weight of calcium oxide, at least 7% by weight of finely ground periclase, and about 5 to 20% by weight of silica.

10. An investment composition comprising about 3 to 35% by weight of a binder consisting essentially of at least one calcium aluminate compound having from about 47 to 49% by weight of calcium oxide, and about 3 to 75% by weight of kyanite, the balance being made up of substantially inert refractory filler.

11. An investment composition comprising about 15 to 35% by weight of a binder consisting essentially of at least one calcium aluminate compound having from about 47 to 49% by weight of calcium oxide, about 3 to 15% by weight of finely ground periclase, and about 15 to 45% of zircon, the balance being made up of a substantially inert refractory filler.

12. An investment composition as claimed in claim 12, including at least 10% by weight of finely ground zircon, said filler consisting essentially of calcined alumina and being present in an amount up to about 71% by weight of the entire composition.

13. An investment composition comprising about 15 to 35% by weight of a binder consisting essentially of at least one calcium aluminate compound have from about 47 to 49% by weight of calcium oxide, at least 7% by weight of finely ground periclase, and about 7.5 to 20% by weight of silica, the balance being made up of a substantially inert refractory filler.

14. An investment composition as claimed in claim 13, the inert refractory filler consisting essentially of coarsely ground periclase, the total periclase in said composition ranging from about 60 to 77% by weight.

15. An investment composition comprising about 15 to 35% by weight of a binder consisting essentially of at least one calcium aluminate compound having from about 47 to 49% by weight of calcium oxide, and up to 75% by weight of kyanite, at least 3% by weight of the entire composition comprising finely ground kyanite, the balance being made up of a substantially inert refractory filler.

16. The process of making a mold for casting metal which comprises mixing a comminuted refractory material selected from the group consisting of (a) periclase and zircon, (b) periclase and silica, and (c) kyanite, wherein (a) is 3 to 75% periclase and 5 to 75% zircon, by weight of the composition, and (b) is 7 to 92% periclase and 5 to 20% silica, by weight of the composition, with about 3 to 35% by weight of calcium aluminate comprising about 15 to 49% by weight of calcium oxide, adding water to the mixture to prepare a plastic moldable mass, shaping the mass to form a mold, and firing said mold.

17. The process according to claim 16, wherein said calcium aluminate consists essentially of at least one compound having from about 47 to 49% by weight of calcium oxide.

18. The process according to claim 16, wherein said water contains an inorganic chloride to modify the properties of said mold, said chloride being employed in an amount ranging from about 1 to 2% by weight of the mixed refractory and calcium aluminate.

19. An investment composition as defined in claim 1, further containing about 1 to 2% of an inorganic halide based on the weight of the balance of the composition.

References Cited in the file of this patent
UNITED STATES PATENTS

| | | |
|---|---|---|
| 1,902,419 | Plant et al. | Mar. 21, 1933 |
| 2,043,249 | Jones | June 9, 1936 |
| 2,081,558 | Prange | May 25, 1937 |
| 2,233,701 | Grossman | Mar. 4, 1941 |
| 2,372,236 | Wainer | Mar. 27, 1945 |
| 2,380,945 | Collins | Aug. 7, 1945 |
| 2,812,265 | Folsom | Nov. 5, 1957 |

OTHER REFERENCES

Gardner: "Chemical Synonyms and Trade Names," pub by Technical Press Ltd. (1948) p. 315.

Searle: Refractory Materials, published in London (1924), 2nd edition (pp. 70–71 relied upon).